United States Patent [19]

Akashi et al.

[11] 4,386,258
[45] May 31, 1983

[54] HIGH FREQUENCY MAGNETIC FIELD COUPLING ARC PLASMA REACTOR

[75] Inventors: Kazuo Akashi, Matsudo; Toyonobu Yoshida, Tokyo; Ryuichi Ishizuka, Tama, all of Japan

[73] Assignees: Nippon Mining Co., Ltd.; Asahi Kasei Kogyo Kabushiki Kaisha, both of Tokyo, Japan

[21] Appl. No.: 282,695

[22] Filed: Jul. 13, 1981

Related U.S. Application Data

[63] Continuation of Ser. No. 64,705, Aug. 8, 1979, abandoned.

[30] Foreign Application Priority Data

Aug. 28, 1978 [JP] Japan ................................. 53-104630

[51] Int. Cl.³ ............................................... B23K 9/00
[52] U.S. Cl. .................... 219/121 PM; 315/111.21; 315/111.51; 219/121 P; 219/121 PR; 219/121 PN
[58] Field of Search ...... 219/121 P, 121 PY, 121 PN, 219/121 PM, 121 PR, 121 PP; 313/231.3, 231.4, 231.5, 231.6; 315/111.21, 111.51

[56] References Cited

U.S. PATENT DOCUMENTS

| | | | |
|---|---|---|---|
| 3,296,410 | 1/1967 | Hedger | 315/111.51 X |
| 3,373,306 | 3/1968 | Karlovitz | 219/121 P |
| 3,407,281 | 10/1968 | Greene et al. | 219/121 PR |
| 3,586,905 | 6/1971 | Bignell | 219/121 PR |
| 3,620,008 | 11/1971 | Newbold | 219/121 PN |
| 3,862,393 | 1/1975 | Dundas et al. | 219/121 PR |
| 4,024,373 | 5/1977 | Bykhousky et al. | 219/121 PN |
| 4,035,604 | 7/1977 | Meleka et al. | 219/121 PR |
| 4,266,113 | 5/1981 | Denton et al. | 219/121 PN |

OTHER PUBLICATIONS

AIAA Journal, "Stale Control of Flowing Plasma . . . Fields", vol. 5, No. 5, May 1967, pp. 1015–1016.

*Primary Examiner*—M. H. Paschall
*Attorney, Agent, or Firm*—Sughrue, Mion, Zinn, Macpeak and Seas

[57] ABSTRACT

A plasma reactor is developed on the fact that a high frequency plasma flame is larger in volume and lower in velocity and therefore a reaction material can stay therein for a relatively long period of time. The plasma reactor has a d.c. arc plasma torch provided in the upper part of the pipe which is an electrically insulative pipe high in heat-resistance and corrosion-resistance or is made up of electrically conductive components which are so designed as to prevent magnetic induction, a reaction material continuously introducing pipe opened in the vicinity of the arc plasma jet from the torch, and a high frequency coil wound around the firstly mentioned pipe coaxially with the torch.

8 Claims, 3 Drawing Figures

HIGH FREQUENCY MAGNETIC FIELD COUPLING ARC PLASMA REACTOR

This is a continuation of application Ser. No. 64,705, filed Aug. 8, 1979, now abandoned.

BACKGROUND OF THE INVENTION

This invention relates to a novel high frequency magnetic field coupling arc plasma reactor.

If, in the case where a chemical reaction is allowed to take place by using an arc plasma, a reactive material is introduced into the torch, then the reactant or product is necessarily reacted with or stuck to the inner wall of the torch, with the result that the torch is corroded, impurities are mixed, and the plasma becomes unstable. If the reaction causes great heat absorption, it is disadvantageous in energy effect. Accordingly, in general, it is not preferable to introduce a reactive material into the torch. Therefore, a method in which the reactive material is introduced around the plasma jet is extensively employed in the art.

However, since the arc plasma jet is essentially a magnetic fluid whose specific feature resides in its high heat pinch or magnetic pinch effect, the reaction material cannot readily mix into the plasma jet. That is, the reaction material enters only the peripheral portion of the plasma jet where the energy density is low, and the reaction of the reaction material occurs only in the tail flame of the plasma jet. Accordingly, it is difficult to effectively utilize the energy of the arc plasma.

A number of methods of introducing a reaction material into a plasma jet have been proposed in the art. However, at the present, it is difficult to say that these methods successfully introduce the reaction material directly into the plasma jet for satisfactory reaction.

On the other hand, in the case of a high frequency plasma, its heat pinch and magnetic pinch effects are not so high, and therefore its plasma flame is large in volume and relatively low in velocity. Therefore, if it is possible to carry out the reaction in this plasma flame, then a variety of merits may be obtained because the reaction space of the reaction material is increased and the staying period of time of the same is also increased. However, this still involves problems to be solved. A first one of the problems is that even if the reaction material is forced to be introduced into the high frequency plasma flame, it merely passes along the peripheral portion of the plasma flame and cannot pass through the central portion thereof because of a backflow phenomenon attributed to magnetic pressure as is well known in the art. A second problem is that the plasma flame is liable to become unstable by the introduction of the reaction material into the plasma flame.

SUMMARY OF THE INVENTION

Accordingly, an object of this invention is to solve the above-described first and second problems. That is, the inventors have conducted intensive research to solve the first and second problems, based on the fact that the high frequency plasma flame is large in volume and low in velocity and therefore a reaction material can stay therein for a relatively long period of time, as a result of which they have found that the problems can be solved by coupling the arc plasma to the high frequency plasma, and accomplished this invention.

The foregoing object and other objects of the invention have been achieved by the provision of a plasma reactor which comprises: an electrically insulative pipe which is high in heat-resistance and corrosion-resistance, or a pipe made up of an assembly of electrically conductive components which are so designed as to prevent magnetic induction which, otherwise, may be caused by an axial high frequency magnetic field; a d.c. arc plasma torch provided in the upper part of the pipe; a reaction material continuously introducing means which is opened in the vicinity of an arc plasma jet from the torch; and a high frequency induction coil provided outside the pipe in such a manner that the coil and the torch have a common center line in the action zone of the arc plasma jet.

Coupling the high frequency plasma to the arc plasma has been tried in the art. For instance, introduction of a d.c. arc plasma using argon gas upwardly into a high frequency induction magnetic field is disclosed in AIAA Journal, vol. 5, No. 5, May 1967, pp 1015 to 1017 by P. J. Vermeulen. However, this is merely a trial of coupling them, and it is not disclosed at all that chemical reaction is allowed to take place in the plasma flame by introducing the reaction material. Accordingly, the publication is completely different from the present invention.

By the provision of the reactor according to this invention, effective chemical action takes place in a high frequency plasma for the first time. More specifically, the arc plasma is a so-called "kindling coal" for the high frequency plasma flame. Even if the instability of the high frequency plasma flame is increased by the introduction of the reaction material, the high frequency plasma can stably operate because ions and electrons are supplied from the arc plasma. The reaction material from the reaction material introducing means, opened in the vicinity of the arc plasma jet, can pass through the central portion of the high frequency plasma flame owing to the high kinetic energy of the arc plasma jet. In other words, the tail portion of the arc plasma jet into which the reaction material is introduced is brought to the center of the upper portion of the high frequency plasma flame large in volume, as a result of which the reaction material completely utilizes the total energy of the large volume plasma flame and the total energy of the arc plasma jet. Thus, according to the invention, an epoch-making plasma reactor excellent in stability and energy utilizing efficiency is provided.

The reactor according to the invention is used in combination with a reaction product cooling and collecting means and a gas continuously discharging means which are provided therefor.

In the reactor according to the invention, a variety of reaction materials can be introduced, and large plasma flames can be obtained at all times. In addition, it is possible to let the reaction material stay in the plasma flame for a sufficiently long period of time. The reactor is scarcely corroded by the reactive material. Reaction products with high purity can be effectively obtained by various chemical reactions with the aid of the plasma flame. The reactor can operate for a considerably long period of time.

The reactor according to the invention is effective especially in reduction, thermal decomposition, compound synthesis, fine particle manufacture and non-crystal manufacture at high temperature.

The nature, principle and utility of the invention will become more apparent from the following detailed description when read in conjunction with the accompanying drawings, in which like parts are designated by like reference numerals.

DETAILED DESCRIPTION OF THE INVENTION

Figure 1:
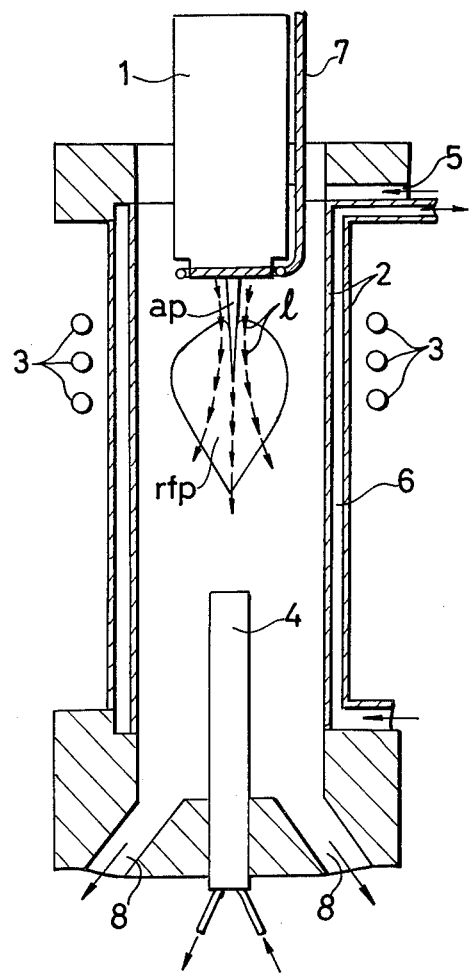
FIG. 1 is a vertical sectional view of one example of a high frequency magnetic field coupling arc plasma reactor according to this invention.

One example of a high frequency magnetic field coupling arc plasma reactor according to this invention, as shown in FIG. 1, comprises: an arc plasma torch 1; a quartz pipe 2; a high frequency induction coil 3 of constant pitch (only its section being shown for clarification of the figure); a cooling copper mold 4; a cooling gas inlet 5; a water-cooling jacket 6; a reaction material introducing pipe 7; and gas discharging outlets 8. It is preferable to provide a plurality of gas discharging outlets 8 at symmetrical positions, which are connected to a system consisting of a cyclone, a bag filter and a vacuum pump.

Figure 2:
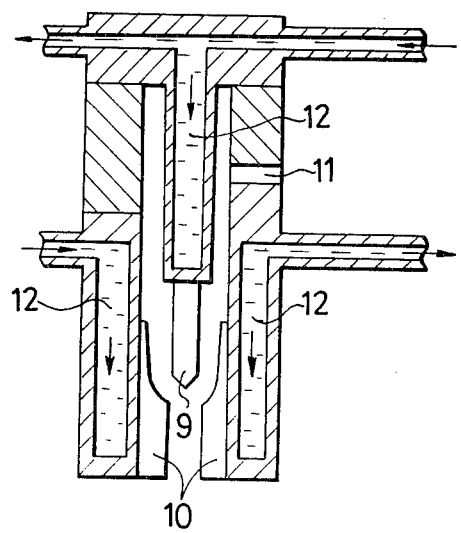
FIG. 2 is a vertical sectional view of one example of an arc plasma torch shown in FIG. 1

FIG. 2 is a vertical sectional view of one example of the arc plasma torch shown in FIG. 1. The arc plasma torch comprises: a tungsten cathode 9; a copper anode 10 which serves as a gas nozzle also; a plasma gas introducing inlet 11; and a water-cooling space 12.

Referring back to FIG. 1, the reaction material introducing pipe 7 is in contact with the lower end of the arc plasma torch and is annular. The reaction material introducing pipe 7 has a plurality of small holes through which the reacting material is jetted downwardly and inwardly.

In the reactor thus constructed, an arc plasma aP and a high frequency plasma rfP are generated as shown in FIG. 1. The reaction material together with the arc plasma flows into the high frequency plasma flame as indicated by the curved arrows 1, and is heated therein. In the reactor, the high frequency plasma rfP is stably maintained by the arc plasma aP, and the reaction material is allowed to stay for a sufficiently long period of time and at a sufficiently high temperature, with the result that a stable, effective high temperature reaction is carried out. Not only is the high temperature reaction stably carried out, but also the corrosion of the arc plasma torch's electrode due to the reactive material can be prevented. Accordingly, mixing impurities with the reaction product can be avoided, which leads to a long run of the reactor. The aimed reaction product obtained through the reaction is condensed and collected by the inner wall of the quartz pipe and by the cooling copper mold provided at the lower part of the reactor, while the gas is discharged through the gas discharging outlets.

Figure 3:
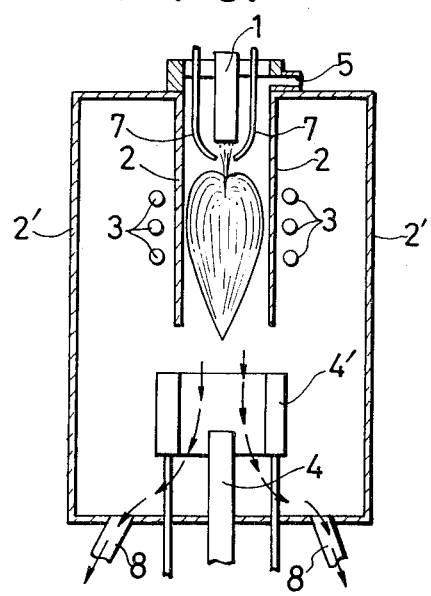
FIG. 3 is a vertical sectional view of another example of the reactor according to the invention.

Another example of the reactor according to the invention, as shown in FIG. 3, comprises: a cooling pipe 4' made of copper or glass; and a sealed container 2'. The remaining components are similar to those shown in FIG. 1, and accordingly similarly numbered. The reaction material is introduced through the introducing pipe 7 which is opened in the vicinity of the arc plasma jet stream, so that it together with the arc plasma is injected into the high frequency plasma flame. Such an introducing pipe is suitable for the reaction material which is powder. The introducing pipe shown in FIG. 1 is suitable for the introduction of reaction gas.

In the reactor shown in FIG. 1, the quartz pipe itself serves as a reaction container. In the reactor shown in FIG. 3, the quartz pipe is provided in the reaction container.

While there has been described in connection with the preferred embodiment of this invention, it will be obvious to those skilled in the art that various changes and modification may be made therein without departing from the invention, and it is aimed, therefore, to cover in the appended claims all such changes and modifications as fall within the true spirit and scope of the invention.

What is claimed is:

1. A plasma reactor comprising:
    a pipe in which a plasma flame is provided;
    a d.c. arc plasma torch provided in the upper part of said pipe, said torch being formed by an inner cathode electrode surrounded by an outer anode electrode, the lower end of said cathode being positioned higher than the lower end of said anode;
    a reaction material continuously introducing means, which is opened in the vicinity of the arc plasma jet from said torch, for introducing reaction material into said arc plasma jet inside said pipe, said material introducing means comprising outlets positioned adjacent to said torch to downwardly direct said reaction material;
    induction coil means, having a constant coil pitch for coupling a radio frequency electromagnetic field to the arc plasma jet to generate a radio frequency plasma within said pipe, said coil means surrounding said pipe in a manner such that said coil means and said torch have a common center line in the action zone of said arc plasma jet, the upper portion of said coil means being positioned closely adjacent said arc plasma torch in order to couple said arc plasma jet to said radio frequency plasma in the vicinity of said torch, so that the tail end of said arc plasma jet is located in the center of the upper portion of the radio frequency plasma, and so that the maximum volume of plasma flame is provided within said pipe;
    cooling means adapted to supply cooling gas downwardly along the interior surface of said pipe, said cooling means comprising a cooling gas inlet at the upper portion of said pipe and a plurality of gas discharging outlets at the lower portion of said pipe for causing cooling gas to flow along the inside peripheral surface of said pipe; and
    cooling jacket means disposed around the outside of said pipe for carrying flowing cooling water to cool said pipe.

2. A plasma reactor as claimed in claim 1, in which said pipe is an electrically insulative pipe which is high in heat-resistance and corrosion-resistance.

3. A plasma reactor as claimed in claim 1, in which said pipe is made up of the assembly of electrically conductive components which are so designed as to prevent magnetic induction which, otherwise, may be caused by an axial high frequency magnetic field.

4. A plasma reactor as claimed in claim 1 wherein said introducing means is in contact with said torch's lower end from which said arc plasma jet emanates.

5. A plasma reactor as defined in claim 1, wherein said material introducing means is a conduit whose lower end opens inside said pipe, and further comprising means for blocking fluid communication between said induction coil means and the inside of said pipe so that said coil means is not exposed to the reaction material.

6. The plasma reactor of claim 1, wherein said pipe is a double walled structure, the outer wall of which forms said cooling jacket means, so that the cooling water flows between the two walls, and the inner wall of which forms said inner peripheral surface.

7. The plasma reactor of claim 1 further comprising a cooling copper mold provided at the lower interior part of said pipe to collect the reaction product.

8. The plasma reactor of claim 6 further comprising a cooling copper mold provided at the lower interior part of said pipe to collect the reaction product.

* * * * *